May 26, 1959 B. E. HOOPER 2,888,607

TELEVISION RECEIVER

Filed Jan. 3, 1956

Inventor
BRIAN E. HOOPER
by
Mason, Kolehmainen, Rathburn and Wyss
Attorneys 2,888,607
Patented May 26, 1959

2,888,607

TELEVISION RECEIVER

Brian E. Hooper, Buffalo, N.Y., assignor to Sylvania Electric Products, Inc., a corporation of New York Application January 3, 1956, Serial No. 557,080
6 Claims. (Cl. 315—27)

Figures 1, 2:
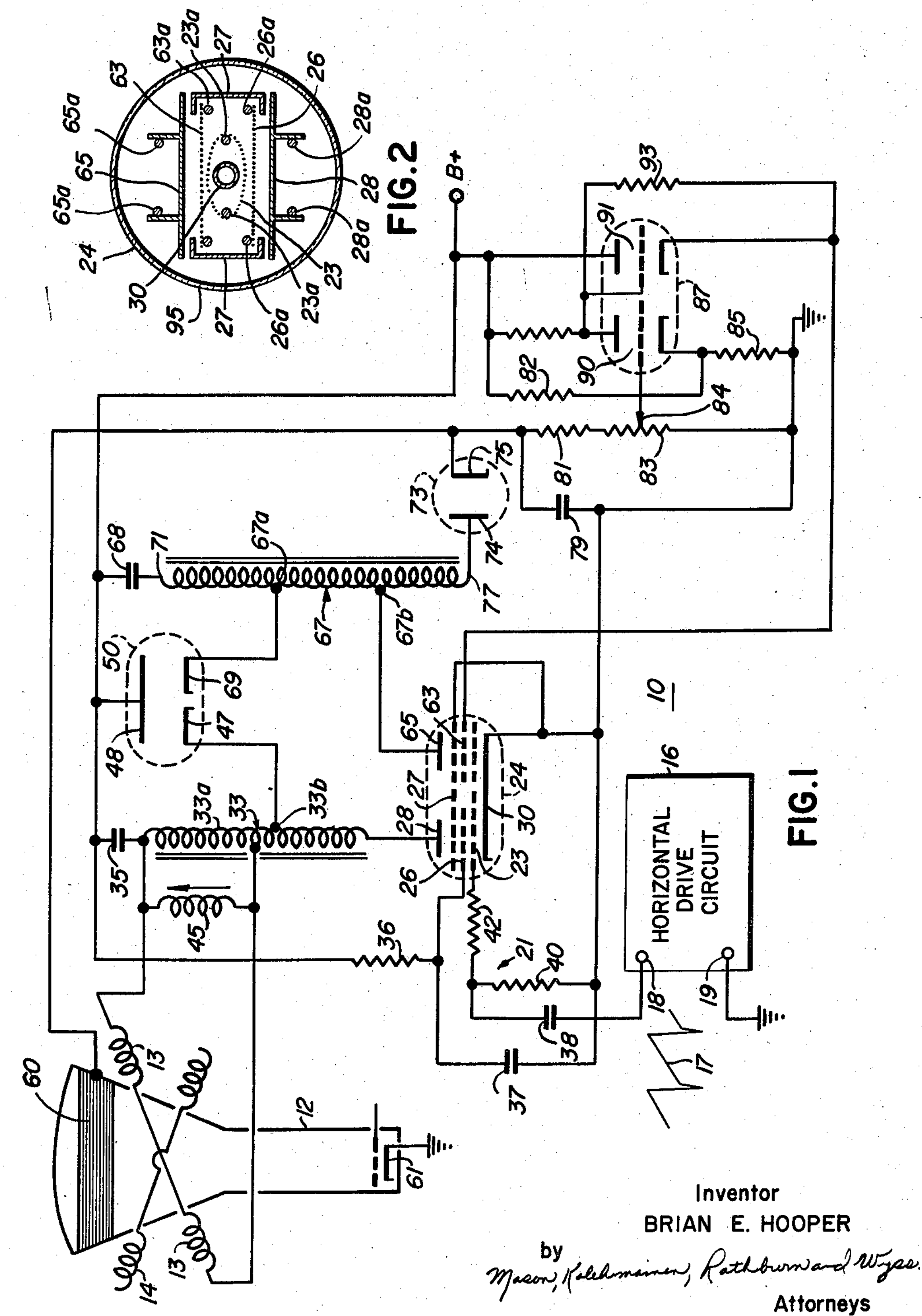

The present invention relates to television receivers, more particularly to the regulated high voltage and horizontal deflection portions of television receivers, and the invention has for a principal object the provision of a combined regulated high voltage supply and horizontal deflection output circuit for low cost television receivers.

In present day television receivers, particularly in the field of color television, it is becoming increasingly important to provide a compact, well regulated high voltage supply for the television picture tube. In prior art receivers, various voltage regulation arrangements have been provided for maintaining the accelerating anode voltage of the picture tube relatively constant to prevent variations in picture size, brightness, linearity and focus. One such arrangement has utilized the non-linear impedance characteristic of a resistance element which is connected as a bleeder across the output terminals of the high voltage supply so that variations in the loading of the output transformer are reduced. However, the quality of regulation thus achieved is not comparable with that effected by the more commonly used feedback techniques. In another arrangement heretofore proposed a dummy load tube is connected in circuit with the picture tube and the high voltage output transformer. By controlling the impedance of the dummy load tube in accordance with variations in the high voltage, regulation is achieved without interaction with the horizontal deflection circuit. A third arrangement employs separate high voltage and horizontal deflection tubes and achieves better regulation than the first two arrangements but is relatively expensive since it involves two output tubes and two damping diodes.

Therefore, another object of the present invention is to provide a new and improved regulation system which provides high quality regulation of a high voltage, and low current drain on the power source while being sufficiently economical to be incorporated in competitive types of television receivers.

A further object of this invention is to provide a new and improved combined deflection and regulated high voltage power supply circuit for television receivers wherein independent adjustments of the deflection and regulated high voltage portions of the circuit may be made while providing a circuit which is reliable in its operation and is relatively simple and inexpensive to manufacture.

A still further object of the invention is to provide high quality regulation of the high voltage supply of a television receiver without substantially increasing the number of tubes in the receiver.

Another object of the present invention is to provide a new and improved multi-electrode discharge device which is particularly applicable for use in the deflection and high voltage circuits of a television receiver.

Briefly, the above and further objects are realized in accordance with one aspect of the present invention by providing a combined deflection and high voltage output tube having two tube sections provided with isolated output circuits and a common input circuit. A conventional horizontal drive signal is applied to the common input circuit of both tube sections. One tube output circuit is connected to a horizontal deflection output transformer which is connected to the horizontal deflection coils of the receiver. The other output circuit is connected to a high voltage transformer which is connected to a high voltage rectifier to provide an accelerating voltage suitable for energization of the second anode of the picture tube. High voltage regulation is achieved by means of a feedback arrangement which controls the current in the high voltage section of the output tube without affecting the operation of the horizontal deflection section thereof. However, the two sections of the output tube are contained in the same envelope and are provided with a number of common control elements so that a standard pin tube base may be employed. In accordance with another aspect of the invention a common damping diode is provided for both transformers, this damping diode having separate cathode circuits which may be connected to the deflection and high voltage transformers although the two diode sections are contained in one envelope.

The invention, both as to its organization and method of operation, together with further objects and advantages thereof, will best be understood by reference to the following detailed description taken in connection with the accompanying drawing, in which:

Fig. 1 is a schematic circuit diagram of a combined deflection and high voltage circuit embodying the present invention; and Fig. 2 is a schematic illustration of a discharge device embodying the present invention.

Referring now to the drawing, and particularly Fig. 1 thereof, the combined deflection and high voltage circuit 10 of the present invention is therein illustrated in connection with a picture tube 12 and the horizontal drive circuit 16 of a television receiver, it being understood that the other portions of the receiver may be of conventional design and have therefore been omitted from the drawing to simplify description of the present invention. The circuit 10 supplies a polarized voltage of high value to the second anode of the television picture tube 12 and also supplies a suitably shaped deflection current wave to the horizontal deflection windings 13 which in connection with the vertical deflection winding 14 cause the electron beam of the tube 12 periodically to traverse a raster on the screen thereof.

The horizontal drive circuit 16 develops a conventional deflection waveform 17 between its respective output terminals 18 and 19, the terminal 19 being connected to ground. In order to drive the horizontal deflection windings 13, the voltage 17 appearing at the terminal 18 is coupled through a condenser 38 and a resistor 42 to the control electrode 23 of a combined deflection and high voltage output tube 24. The tube 24 comprises a horizontal deflection section which includes a cathode 30, the control electrode 23, a screen electrode 26, a suppressor electrode 27 and an anode 28. The tube 24 also includes a high voltage section which includes the cathode 30, the input electrode 23, a separate screen electrode 63, the suppressor electrode 27 and a separate anode 65.

The cathode 30 and the suppressor 27 are connected directly to ground, the anode 28 is energized from a suitable source of polarized voltage which is applied to the B+ terminal, and the screen electrode 26 is energized from this same source of polarized voltage through the resistor 36. Any high frequency signals which may appear at the screen 26 are bypassed to ground through a capacitor 37. A grid leak resistor 40 is connected from the junction point of the condenser 38 and resistor 42 to ground.

In order to utilize the deflection signal from the deflection section of the tube 24 to cause the electron beam of the device 12 to scan a horizontal trace on the face thereof, the horizontal deflection windings 13 are serially connected across a portion 33a of the winding of a horizontal output autotransformer 33, one end of the transfromer 33 being connected to the anode 28 and the other end being connected through the condenser 35 to the B+ supply. Conventionally, an adjustable inductance device 45 is shunted across the windings 13 to enable adjustment of the width of the raster appearing on the face of the picture tube 12. It will be understood, of course, that the inductance device 45 could equally well be connected in series with the horizontal deflection windings 13 to effect this same result.

The deflection wave 17 developed in the drive circuit 16 is amplified and shaped in the deflection section of the tube 24 and the output transformer 33 for application to the horizontal scanning coils 13. The capacitor 35 provides a boosted B+ supply for the anode 28 since the capacitor 35 is charged during periods when the anode 28—cathode 30 path of tube 24 is nonconductive.

In order to provide a well regulated acceleration voltage for the second anode 60 of the television picture tube 12, the high voltage section of the tube 24 is excited by the driving voltage 17 which is applied to the common input electrode 23 and the anode 65 is connected to a tap 67b on a high voltage auto transformer 67, the upper end 71 of the transformer 67 being connected through a condenser 68 to the B+ supply. The bottom end 77 of the transformer 67 is connected to the anode 74 of a high voltage rectifier 73, the cathode 75 of which is connected to a high voltage filter condenser 79 so that a suitable acceleration voltage is developed across the condenser 79 which is impressed upon the second anode of the picture tube 12.

In order to regulate the high voltage produced across the condenser 79, a voltage divider network including the resistor 81 and the potentiometer 83 is connected across the condenser 79, the arm 84 of the potentiometer 83 being connected to the control grid of the left-hand section 90 of a double triode control and regulating tube 87. The cathode of the tube section 90 is biased positively by means of the voltage divider network 82, 85 connected between the B+ supply and ground. The tube section 91 is connected as a series regulator between the B+ supply and the screen electrode 63 of the high voltage section of the tube 24, and by varying the voltage between the screen electrode 63 and the cathode 30 inversely with changes in the value of the second anode voltage, a well regulated second anode voltage is provided.

In order to accentuate changes which may be produced in the second anode voltage due to line voltage fluctuations and the like, the resistor 81 may be selected to have a nonlinear impedance characteristic, such as, for example, one having an impedance value in accordance with the following equation:

$$R=\frac{E}{I^6}$$

Since the resistance value of the potentiometer 83 remains substantially constant, a voltage amplification or accentuation of the voltage change is effected by the divider network 81, 83. Further amplification and phase reversal of the signal appearing at the arm 84 is provided by the tube section 90 which is connected as a D.C. amplifier. The anode of the tube section 90 is directly connected to the control electrode of the triode section 91 whereby the voltage drop across the triode 91 varies in a direct relationship to the second anode voltage. With this circuit arrangement a high degree of regulation of the second anode voltage of the television picture tube is afforded.

In order to damp out oscillations which may arise in the transformers 33 and 67 during the horizontal retrace intervals, there is provided a two section damping diode 50 having a common anode 48 which is connected to the B+ supply and separate cathodes 47 and 69 which are respectively connected to the taps 33b and 67a on the transformers 33 and 67. However, it will be noted that relatively little insulation is required between the cathodes 47 and 69 because these elements are operated essentially in phase. Accordingly, the two diode sections may be contained in the same envelope to provide a relatively inexpensive damping diode arrangement. It will also be noted that relatively little insulation is required between the anode caps of the anodes 28 and 65 of the tube 24 since both sections of this tube are operated in phase by virtue of the common input drive signal 17.

By providing the condenser 68 a boosted B+ voltage is provided at the upper end 71 of the transformer 67 and this boosted B+ voltage is regulated to the same degree as the accelerating voltage provided for the second anode of the picture tube 12. Accordingly, the regulated boosted B+ voltage provided at the upper end 71 of the transformer 67 may be employed to energize other portions of the receiver, such as the vertical deflection circuit or the like.

In order to heat the cathode 75 of the high voltage rectifier 73, the filament thereof (not shown) is preferably energized from a small winding on the core of the transformer 33 since the circulating current in the transformer 33 will be greater than in the transformer 67.

Referring to Fig. 2, there is shown in somewhat diagrammatic form a cross-section of a discharge device constructed in accordance with another aspect of the present invention and which is particularly suited for use as the output 24 in the circuit of Fig. 1. The electrodes of the device shown in Fig. 2 are designated by the same reference numerals used to identify similar electrodes of the tube 24 in Fig. 1. Thus, the tube 24 includes a pair of spaced apart anodes 28 and 65, respectively mounted on a plurality of support posts 28a and 65a, the anodes 28 and 65 being symmetrically arranged with respect to the central cathode 30 which may be heated by any suitable filament arrangement (not shown). The control electrode 23, which is supported on posts 23a, surrounds the cathode 30 and is disposed in close proximity thereto so as to provide a relatively high amplification factor for both sections of the tube 24. The screen grid 26 is substantially planar in construction and is interposed between the control electrode 23 and the anode 28. The screen electrode 63, which is substantially identical in construction with the screen electrode 26, is interposed between the control electrode 23 and the anode 65. The screen electrodes 26 and 63 are respectively mounted on a plurality of support posts 26a and 63a. The beam forming electrode 27 is provided in two parts on opposite sides of the screen electrodes 26 and 63, which parts are suitably connected internally of the tube envelope. The terminals for the anodes 28 and 65 may be in the form of two caps extending from the top of the tube envelope 95 and the other electrodes may be connected to suitable tube pins in a tube base of standard design.

While there has been described what is at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In combination, a source of deflection voltage; a deflection transformer, an amplifier connecting said source to said transformer; an autotransformer; a second amplifier connecting said source to said autotransformer said second amplifier having a screen grid; a damping tube having a single plate and a pair of cathodes, the plate being connected to the high potential ends of said transformers, one of said cathodes being connected to an intermediate point on said deflection transformer and the other cathode of said damping tube being connected to an intermediate point on said autotransformer; a rectifier for rectifying high voltages developed by said autotransformer; a source of positive potential; a regulator tube having an anode, a control grid and a cathode, the cathode being connected to the screen grid of said amplifier and the anode of said regulator tube being connected to said source of positive potential; and means for controlling the voltage applied to the control grid of said regulator tube in accordance with a fraction of the voltage developed by said rectifier.

2. Apparatus as claimed in the preceding claim characterized by the fact that said amplifiers have a common envelope within which are a common cathode for both amplifiers, a common control grid for both amplifiers, a common suppressor grid for both amplifiers and electrically individual plates and screen grids for said amplifiers.

3. In combination, a source of pulsating voltage; an amplifier having an anode, a cathode, a control grid and a screen grid; means to apply the pulsating voltage to the control grid and cathode of said amplifier; an autotransformer connected to the anode of said amplifier; a rectifier rectifying high voltages developed by said autotransformer; a potentiometer from which a voltage, that is only a fraction of the rectified voltage, may be derived; a regulator tube having a plate, a grid and a cathode; a source of plate potential for said regulator tube; means connecting the plate of the regulator tube to said source of plate potential and the cathode of said regulating tube to the screen grid of said amplifier whereby the anode to cathode impedance of said regulator tube is in series with said screen grid and source of plate potential; and, means for applying a voltage to the control grid of said regulator tube, said applied voltage being under control of the fractional voltage derived from said potentiometer.

4. In combination, a source of deflection voltage; a deflection transformer, an amplifier connecting said source to said transformer; an autotransformer; a second amplifier connecting said source to said autotransformer said second amplifier having a screen grid; a rectifier for rectifying high voltages developed by said autotransformer; a potentiometer connected to the rectifier, a source of positive potential; a regulator tube having an anode, a control grid and a cathode, the cathode being connected to the screen grid of said amplifier and the anode of said regulator tube being connected to said source of positive potential; a direct current amplifier for amplifying a voltage taken from said potentiometer; and means for controlling the voltage applied to the control grid of said regulator tube in accordance with the output of said direct current amplifier.

5. Apparatus as claimed in the preceding claim characterized by the fact that said amplifiers connected to said transformers have a common envelope within which are a common cathode for both amplifiers, a common control grid for both amplifiers, a common suppressor grid for both amplifiers and electrically individual plates and screen grids for said amplifiers.

6. In combination, a source of pulsating voltage; an amplifier having an anode, a cathode, a control grid and a screen grid; means to apply the pulsating voltage to the control grid and cathode of said amplifier; an autotransformer connected to the anode of said amplifier; a rectifier rectifying high voltages developed by said autotransformer; a potentiometer from which a voltage, that is only a fraction of the rectified voltage, may be derived; a regulator tube having a plate, a grid and a cathode; a source of plate potential for said regulator tube; means connecting the plate of the regulator tube to said source of plate ode impedance of said regulator tube is in series with potential and the cathode of said regulating tube to the screen grid of said amplifier whereby the anode to cath- said screen grid and source of plate potential; a direct age derived from said potentiometer to the input of said direct current amplifier and means for applying the current amplifier; means for feeding the fractional volt- developed output voltage of said direct current amplifier to the grid of said regulator tube.

References Cited in the file of this patent

UNITED STATES PATENTS

| | | |
|---|---|---|
| 2,086,271 | Jobst et al. | July 6, 1937 |
| 2,325,664 | Cohn | Aug. 3, 1943 |
| 2,693,549 | Vonderschmitt | Nov. 2, 1954 |
| 2,697,798 | Schlesinger | Dec. 21, 1954 |
| 2,712,092 | Schwarz | June 28, 1955 |
| 2,771,517 | Harrison et al. | Nov. 20, 1956 |

UNITED STATES PATENT OFFICE

CERTIFICATE OF CORRECTION

Patent No. 2,888,607 May 26, 1959

Brian E. Hooper

It is hereby certified that error appears in the printed specification of the above numbered patent requiring correction and that the said Letters Patent should read as corrected below.

Column 6, line 26, beginning with "ode impedance of said regulator tube", strike out all to and including "of said regulator tube." in line 34, same column, and insert instead the following:

> potential and the cathode of said regulating tube to the screen grid of said amplifier whereby the anode to cathode impedance of said regulator tube is in series with said screen grid and source of plate potential; a direct current amplifier; means for feeding the fractional voltage derived from said potentiometer to the input of said direct current amplifier and means for applying the developed output voltage of said direct current amplifier to the grid of said regulator tube.

Signed and sealed this 3rd day of November 1959.

(SEAL)
Attest:

KARL H. AXLINE
Attesting Officer

ROBERT C. WATSON
Commissioner of Patents